United States Patent
Buechter et al.

(10) Patent No.: US 12,041,200 B2
(45) Date of Patent: Jul. 16, 2024

(54) EMERGENCY CALL HANDLING IN A TELECOMMUNICATIONS NETWORK

(71) Applicant: Deutsche Telekom AG, Bonn (DE)

(72) Inventors: Martin Buechter, Troisdorf (DE); Reinhard Lauster, St. Poelten (AT)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 17/917,253

(22) PCT Filed: Apr. 6, 2021

(86) PCT No.: PCT/EP2021/058912
§ 371 (c)(1),
(2) Date: Oct. 6, 2022

(87) PCT Pub. No.: WO2021/204784
PCT Pub. Date: Oct. 14, 2021

(65) Prior Publication Data
US 2023/0156122 A1 May 18, 2023

(30) Foreign Application Priority Data
Apr. 8, 2020 (EP) .................... 20168817

(51) Int. Cl.
*H04M 3/51* (2006.01)
*H04L 65/1016* (2022.01)
*H04L 65/1073* (2022.01)
*H04W 4/90* (2018.01)

(52) U.S. Cl.
CPC ....... *H04M 3/5116* (2013.01); *H04L 65/1016* (2013.01); *H04L 65/1073* (2013.01); *H04W 4/90* (2018.02); *H04M 2242/04* (2013.01)

(58) Field of Classification Search
CPC ............ H04M 3/5116; H04M 2242/04; H04L 65/1016; H04L 65/1073; H04W 4/90
See application file for complete search history.

(56) References Cited

U.S. PATENT DOCUMENTS

2004/0192251 A1* 9/2004 Zhao ..................... H04W 76/50
455/435.1
2004/0203572 A1* 10/2004 Aerrabotu ............... H04W 4/90
455/404.1
(Continued)

*Primary Examiner* — Justin Y Lee
(74) *Attorney, Agent, or Firm* — LEYDIG, VOIT & MAYER, LTD.

(57) ABSTRACT

A method for enhanced emergency call handling and/or continuation of an emergency call in a telecommunications network includes: in a first step, an emergency call is initiated by a mobile communication device and set up as an IP multimedia subsystem emergency call; in a second step, during or subsequent to the first step, the mobile communication device receives, from the telecommunications network, a temporary local profile information comprising a security credential information and comprising or corresponding to a public identity of the mobile communication device and provided by the telecommunications network; and in a third step, subsequent to the second step, the mobile communication device triggers an IP multimedia subsystem registration at or to the telecommunications network, using the temporary local profile information.

11 Claims, 1 Drawing Sheet

(56) References Cited

U.S. PATENT DOCUMENTS

| | | | |
|---|---|---|---|
| 2007/0060097 A1* | 3/2007 | Edge | H04W 4/90 455/404.1 |
| 2008/0008157 A1* | 1/2008 | Edge | H04W 76/50 370/351 |
| 2019/0068785 A1* | 2/2019 | Cañas | H04L 65/1016 |
| 2020/0382942 A1* | 12/2020 | Choi | H04W 12/45 |

* cited by examiner

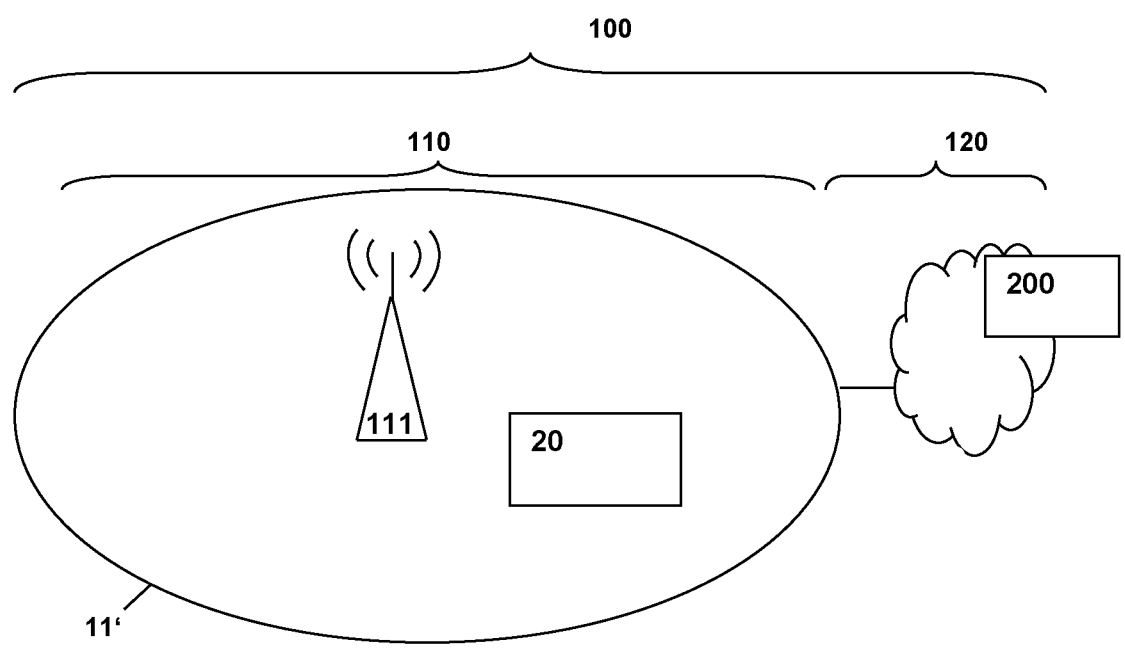

EMERGENCY CALL HANDLING IN A TELECOMMUNICATIONS NETWORK

CROSS-REFERENCE TO PRIOR APPLICATIONS

This application is a U.S. National Phase application under 35 U.S.C. § 371 of International Application No. PCT/EP2021/058912, filed on Apr. 6, 2021, and claims benefit to European Patent Application No. EP 20168817.3, filed on Apr. 8, 2020. The International Application was published in English on Oct. 14, 2021 as WO 2021/204784 A1 under PCT Article 21 (2).

FIELD

The present invention relates a method for enhanced emergency call handling and/or continuation of an emergency call in 4G/5G telecommunications networks—hereinafter also called telecommunications network—, the emergency call involving, on the one hand, a mobile communication device in or connected to the telecommunications network, and, on the other hand, a public safety answering point within or connected to or assigned to the telecommunications network, the mobile communication device corresponding to a roaming user of the telecommunications network or a user lacking a valid subscription of the telecommunications network.

Furthermore, the present invention relates to a system, a telecommunications network and a mobile communication device for enhanced emergency call handling and/or continuation of an emergency call in a telecommunications network, the emergency call involving, on the one hand, a mobile communication device in or connected to the telecommunications network, and, on the other hand, a public safety answering point within or connected to or assigned to the telecommunications network, the system comprising the telecommunications network, the mobile communication device, and the public safety answering point, and the mobile communication device corresponding to
- a roaming user of the telecommunications network and the telecommunications network corresponding to a visited telecommunications network, or
- a user lacking a valid subscription of the telecommunications network.

Furthermore, the present invention relates to a program and to a computer-readable medium for enhanced emergency call handling and/or continuation of an emergency call in a telecommunications network.

BACKGROUND

IP multimedia subsystem (IMS) is the technology defined to provide IP Multimedia services over mobile communication networks. IMS provides key features to enrich the end-user person-to-person communication experience through the integration and interaction of services. IMS allows person-to-person (client-to-client) as well as person-to-content (client-to-server) communications over an IP-based network. IMS makes use of the Session Initiation Protocol (SIP) and Session Description Protocol (SDP) to set up and control calls or sessions between user terminals or mobile communication devices (or mobile communication devices and application servers).

When an emergency call is made to an emergency center such as a public safety answering point (or public safety access point)—hereinafter also called PSAP—special procedures are applied to ensure that the call is correctly routed and, if possible, not interrupted. However, there are situations where emergency calls (and also eCalls, typically originated, e.g., from vehicles) are disconnected or where the public safety answering point might want to call-back the user equipment or mobile communication device after the call has been terminated (intentionally or unintentionally), i.e. there is a need, from the side of the public safety answering point, to reconnect (e.g. in cases of poor mobile coverage or if the public safety answering point has a further advice or a question to be clarified). Certain standards such as European Norm, EN 16062 Clause 7.10, 7.6.3 and EN 16072 Clause 7.13.3 stipulate that when an emergency call is dropped, the standard operating procedure is to initiate a call-back call. Although IETF document IETF RFC 7090 (IETF emergency services architecture) defines a SIP priority header "PSAP-call-back" for IP based systems, this mechanism has the drawback that such procedure is likely to be either not possible or it is likely that such (header) information gets lost in case that the call-back is routed via the home network and several interconnection networks back to the local visited network.

SUMMARY

In an exemplary embodiment, the present invention provides a method for enhanced emergency call handling and/or continuation of an emergency call in a telecommunications network. The emergency call involves, on the one hand, a mobile communication device in or connected to the telecommunications network, and, on the other hand, a public safety answering point within or connected to or assigned to the telecommunications network. The mobile communication device corresponds to a roaming user of the telecommunications network or a user lacking a valid subscription of the telecommunications network. The method includes: in a first step, the emergency call is initiated by the mobile communication device and set up as an IP multimedia subsystem emergency call; in a second step, during or subsequent to the first step, the mobile communication device receives, from the telecommunications network, a temporary local profile information comprising a security credential information and comprising or corresponding to a public identity of the mobile communication device and provided by the telecommunications network; and in a third step, subsequent to the second step, the mobile communication device triggers an IP multimedia subsystem registration at or to the telecommunications network, using the temporary local profile information.

BRIEF DESCRIPTION OF THE DRAWINGS

Subject matter of the present disclosure will be described in even greater detail below based on the exemplary FIGURES. All features described and/or illustrated herein can be used alone or combined in different combinations. The features and advantages of various embodiments will become apparent by reading the following detailed description with reference to the attached drawings, which illustrate the following:

FIG. 1 schematically illustrates, in an exemplary embodiment, a mobile communication device located in a coverage area of a telecommunications network or mobile communication network.

DETAILED DESCRIPTION

Exemplary embodiments of the present invention provide an effective and simple solution such that enhanced emergency call handling and/or continuation of an emergency call in a telecommunications network is possible to be realized even though the mobile communication device corresponds to a roaming user of the telecommunications network or a user lacking a valid subscription of the telecommunications network.

In an exemplary embodiment, the present invention provides a method for enhanced emergency call handling and/or continuation of an emergency call in a telecommunications network, the emergency call involving, on the one hand, a mobile communication device in or connected to the telecommunications network, and, on the other hand, a public safety answering point within or connected to or assigned to the telecommunications network, the mobile communication device corresponding to a roaming user of the telecommunications network or a user lacking a valid subscription of the telecommunications network, the method comprising the following steps:

in a first step, the emergency call is initiated by the mobile communication device and set up as an IMS emergency call, in a second step, during or subsequent to the first step, the mobile communication device receives, from the telecommunications network, a temporary local profile information comprising security credential information and comprising or corresponding to a public identity of the mobile communication device and provided by the telecommunications network, in a third step, subsequent to the second step, the mobile communication device triggers an IMS registration at or to the telecommunications network, using the temporary local profile information.

According to the present invention, it is advantageously possible that outgoing calls from public safety answering points, especially call-back calls (or subsequent calls) to emergencies (or the emergency call initiating entities, typically a mobile communication device) are able to be handled via local lines only (i.e. within the visited public land mobile network or telecommunications network). Additionally, such call-back calls (or subsequent calls) might preferably be granted privileges comparable to those of the originated emergency calls. Via realizing such a procedure according to the present invention, a routing of such call-back calls (or subsequent calls) via the home network and often several interconnection networks as well as back to the local visited network can be avoided. It is especially advantageous according to the present invention that the local telecommunications network or a local network entity such as packet network functions like MME (mobility management entity), AMF (access and mobility management function) or IMS functions like AS (application server), P-CSCF (proxy call session control function), E-CSCF (emergency call session control function), S-CSCF (serving call session control function), PSAP . . . ), i.e. within (or connected to) the local telecommunications network from the perspective of the mobile communication device (typically the visited public land mobile network or the visited telecommunications network in case of the mobile communication device being a roaming user of the telecommunications network) is able to assign (e.g. via SIP signaling) a temporary local profile including a new private/public identity (e.g. an IMSI (International Mobile Subscriber Identity), IMPI (IP multimedia private identity), MSISDN (Mobile Station International Subscriber Directory Number), SIP URI (Session Initiation Protocol Uniform Resource Identifier), temporary eSIM (embedded subscriber identity module) profile, or an identity of another kind) to the user equipment or mobile communication device that was initiating the emergency call in case no such identity is available.

According to conventionally known emergency call procedures, originating emergency calls (e.g. classic emergency calls, or also eCalls) are routed to specific connections used for emergency calls for which special rules and/or requirements apply (i.e. in the direction from the emergency (or mobile communication device) to the public safety answering point): (1) These specific connections used for emergency calls can only be reached via emergency numbers (e.g. 112, 110, 911 etc.) and (2) are neither accessible nor recognizable for "public correspondence" (i.e. normal or standard calls); (3) The transmission of the called party number (i.e. the number under which the public safety answering point is connected), and other parameters need be suppressed by the operator of the switching center to which the emergency call point is activated; (4) To ascertain best grade of service (line busy), no outgoing connections from these lines are allowed; thus no call-back from these lines is allowed. Hence, the re-use of such specific lines and call path used for originated emergency calls is not an option for an emergency call-back (incl. eCall call-back). According to conventionally known emergency call procedures, in case an emergency call-back (incl. eCall call-back) becomes necessary, such calls can only be made via a normal line allowing normal terminating IMS voice calls which are routed from the public safety answering point in the visited network via the home network (of the user equipment subscription) back to the user equipment (or mobile communication device) in the visited network. Additionally, no identification of such a (seemingly normal) terminating call as an emergency call-back is easily guaranteed or possible, and, in case of a roaming scenario, the call-back (to an initial IMS emergency call, including an eCall, typically an IMS voice service) needs to be routed via the HPLMN (home public land mobile network or home telecommunications network) and interconnection networks back to the VLMN (visited public land mobile network or visited telecommunications network).

However, due to in reality often missing interconnection agreements and potentially different implementations in different telecommunications networks, it is not at all certain that the user equipment (or mobile communication device) from which the emergency call originated is associated (from the perspective of the public safety answering point) with credentials (private/public identity like IMSI, (temporary international mobile subscriber identity), MSISDN, SIP URI, temp eSIM profile, etc. . . . ) to which an emergency call-back can be routed. Additionally in roaming cases of home routed calls, these require a considerably effort of separate roaming agreements regarding forwarding additional signaling parameters, charging rules and/or prevention of fraud. Hence, it is more than questionable that according to conventionally known emergency call procedure, a call-back to a previous established originating emergency call (incl. an eCall) would be successful.

The present invention provides a method and a corresponding system, mobile communication device, and telecommunications network such that these above mentioned shortcomings are improved and that allows to establish a call-back—from the public safety answering point to the originating user equipment or mobile communication device—which is not routed via the home public land mobile network or home telecommunications network but which stays (or is routed) within the visited public land mobile network or visited telecommunications network.

According to the present invention, a method for enhanced emergency call handling and/or continuation of an emergency call in a telecommunications network is provided. The emergency call involves, on the one hand, a mobile communication device in or connected to the telecommunications network, and, on the other hand, a public safety answering point within or connected to or assigned to the telecommunications network. The mobile communication device corresponds to a roaming user of the telecommunications network or a user lacking a valid subscription of the telecommunications network. According to the present invention, the emergency call is initiated (or set up), by the mobile communication device, as an IMS emergency call. During or subsequent to this, the mobile communication device receives, from the telecommunications network, a temporary local profile information comprising security credential information and also comprising or corresponding to a public identity of the mobile communication device. The public identity is an identity of (or assigned to) the mobile communication device, and provided by the telecommunications network. In a subsequent step (i.e. subsequent to the transmission of the public identity (within the local, i.e. typically visited, telecommunications network) to the mobile communication device), the mobile communication device triggers an IMS registration at or to the (local, especially visited) telecommunications network, using the temporary local profile information.

It is thereby advantageously possible, according to the present invention, that—in the context of the mobile communication device having placed an emergency call in the local (especially visited) telecommunications network—the mobile communication device is provided with an identity to be able to be reached, within this telecommunications network, at least by a legitimized instance such as a public safety answering point or an analogous entity.

According to the present invention, it is preferred that during the third step, the IMS registration is triggered by the mobile communication device
  either after the mobile communication device detects that
    the emergency call is disconnected,
  or during a call dismantling procedure,
  or during the ongoing emergency call,
wherein especially the mobile communication device triggers the IMS registration
  using an emergency data connection used for the emergency call at or to the telecommunications network, or
  via establishing an emergency data connection at or to the telecommunications network.

Thereby, it is advantageously possible to trigger the IMS registration at different points in time and at or during different stages of the emergency call.

According to a further embodiment of the present invention, in a fourth step, during or subsequent to the first step, the public safety answering point receives at least the public identity of the mobile communication device, wherein the public safety answering point especially receives at least part of the temporary local profile information,
wherein the public safety answering point receives the public identity of the mobile communication device,
  either from the mobile communication device while the emergency call still being, at least partly, functional,
  or from a network entity of or within the telecommunications network.

Thereby, it is advantageously possible according to the present invention that the information regarding the public identity of the mobile communication device is efficiently transmitted to the public safety answering point.

According to still a further embodiment of the present invention, in a fifth step, subsequent to the fourth step, the public safety answering point initiates a call-back to the mobile communication device—using the public identity assigned to the mobile communication device—in order to establish a subsequent call to the mobile communication device to realize a continuation of the emergency communication initiated or set up by the mobile communication device during the first step.

Thereby, it is advantageously possible according to the present invention that the call-back towards the mobile communication device is able to be processed efficiently, especially within the telecommunications network.

According to the present invention, it is furthermore preferred that the subsequent call, during the fifth step, is or corresponds to a privileged call and/or uses a privileged data connection, wherein especially these privileges are equal to or comparable to the privileges of emergency calls, such that, especially, such subsequent calls are prioritized over normal voice calls and/or remain in the telecommunications network and/or bypass user-defined potentially call-blocking configurations.

Thereby, it is advantageously possible that the call-back is able to be protected and privileged in a manner analogous to the emergency call initiated by the mobile communication device.

According to a further embodiment of the present invention, the mobile communication device receives the temporary local profile information
  either from the public safety answering point while the emergency call still being, at least partly, functional,
  or from a network entity of or within the telecommunications network, especially via a NAS (non-access stratum) signaling mechanism, especially from an IMS network entity of the telecommunications network or from a network entity using SIP or via an over the air (OTA) provisioning mechanism.

Thereby, it is advantageously possible according to the present invention that the temporary local profile information is efficiently transmitted to the mobile communication device.

According to the present invention, it is still further preferred that the temporary local profile information additionally comprises validity time information relating to a validity time interval during which the IMS registration of the mobile communication device, and especially its public identity, is valid or usable, wherein especially an IMS de-registration regarding the temporary local profile information is triggered by either the mobile communication device or the telecommunications network.

According to the present invention, it is thereby advantageously possible that the call-back is not possible indefinitely but that the temporary local profile information is valid (and can be used by the user equipment or mobile communication device for registering purposes, and by the public safety answering point for call-back purposes) only during a predetermined time interval.

According to a further embodiment of the present invention it is preferred that the mobile communication device receives the temporary local profile information
  via NAS signaling, especially using information elements, or
  via SIP signaling, especially using header information and/or body information and/or a separate message, and
wherein especially the temporary local profile information is stored, within the mobile communication device, in or as part of an application layer or in or as part of a call processing stack of the mobile communication device, wherein especially the public identity of the mobile communication device is independent from parameters or pieces of identification information related to the mobile communication device.

According to the present invention, it is preferred that the temporary local profile information corresponds to a limited network configuration, wherein the limited network configuration only allows the ability of the mobile communication device to receive calls from the telecommunications network, especially from the public safety answering point, wherein especially the public safety answering point corresponds to a stationary public safety answering point or a non-stationary public safety answering point or a public safety answering point entity, especially an ambulance entity, a firefighter entity, a mountain or sea rescue entity, a third party eCall service provider entity.

Furthermore, the present invention relates to a system for enhanced emergency call handling and/or continuation of an emergency call in a telecommunications network, the emergency call involving, on the one hand, a mobile communication device in or connected to the telecommunications network, and, on the other hand, a public safety answering point within or connected to or assigned to the telecommunications network, the system comprising the telecommunications network, the mobile communication device, and the public safety answering point, and the mobile communication device corresponding to a roaming user of the telecommunications network and the telecommunications network corresponding to a visited telecommunications network, or a user lacking a valid subscription of the telecommunications network, wherein the system is configured such that:

the emergency call is initiated by the mobile communication device and set up as an IMS emergency call, the mobile communication device receives, from the telecommunications network, a temporary local profile information comprising security credential information and comprising or corresponding to a public identity of the mobile communication device and provided by the telecommunications network, the mobile communication device triggers an IMS registration at or to the telecommunications network, using the temporary local profile information.

Furthermore, the present invention relates to a user equipment or mobile communication device for enhanced emergency call handling and/or continuation of an emergency call in a telecommunications network, the emergency call involving, on the one hand, the mobile communication device in or connected to the telecommunications network, and, on the other hand, a public safety answering point within or connected to or assigned to the telecommunications network, and the mobile communication device corresponding to a roaming user of the telecommunications network and the telecommunications network corresponding to a visited telecommunications network, or a user lacking a valid subscription of the telecommunications network, the mobile communication device being configured such that:

the emergency call is initiated by the mobile communication device and set up, by the mobile communication device, as an IMS emergency call, the mobile communication device receives, from the telecommunications network, a temporary local profile information comprising security credential information and comprising or corresponding to a public identity of the mobile communication device and provided by the telecommunications network, the mobile communication device triggers an IMS registration at or to the telecommunications network, using the temporary local profile information.

Furthermore, the present invention relates to a telecommunications network for enhanced emergency call handling and/or continuation of an emergency call in a telecommunications network, the emergency call involving, on the one hand, a mobile communication device in or connected to the telecommunications network, and, on the other hand, a public safety answering point within or connected to or assigned to the telecommunications network, the mobile communication device corresponding to a roaming user of the telecommunications network and the telecommunications network corresponding to a visited telecommunications network, the telecommunications network being configured such that:

the emergency call is received, by the telecommunications network, from the mobile communication device as an IMS emergency call, the telecommunications network transmits, to the mobile communication device, a temporary local profile information comprising security credential information and comprising or corresponding to a public identity of the mobile communication device and provided by the telecommunications network, the mobile communication device triggers an IMS registration at or to the telecommunications network, using the temporary local profile information.

Regarding a system, mobile communication device, user equipment, or telecommunications network according to the present invention, it is preferred that the mobile communication device is configured such that the IMS registration is triggered by the mobile communication device either after the mobile communication device detects that the emergency call is disconnected, or during a call dismantling procedure, or during the ongoing emergency call, wherein especially the mobile communication device triggers the IMS registration using an emergency data connection used for the emergency call at or to the telecommunications network, or via establishing an emergency data connection at or to the telecommunications network.

Additionally, the present invention relates to a program comprising a computer readable program code which, when executed on a computer or on a mobile communication device or on a network node of a telecommunications network, or in part on the mobile communication device and/or in part on the network node of the telecommunications network, causes the computer or the mobile communication device or the network node of the telecommunications network to perform a method according to the present invention.

Still additionally, the present invention relates to a computer-readable medium comprising instructions which when executed on a computer or on a mobile communication device or on a network node of a telecommunications network, or in part on the mobile communication device and/or in part on the network node of the telecommunications network, causes the computer or the mobile communication device or the network node of the telecommunications network to perform a method according to the present invention.

These and other characteristics, features and advantages of the present invention will become apparent from the following detailed description, taken in conjunction with the accompanying drawings, which illustrate, by way of example, principles of the invention. The description is given for the sake of example only, without limiting the scope of the invention. The reference FIGURES quoted below refer to the attached drawings.

The present invention will be described with respect to particular embodiments and with reference to certain drawings but the invention is not limited thereto but only by the claims. The drawings are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a mobile communication network as an example of a telecommunications network 100 such as a public land mobile network is schematically shown. The telecommunications network 100 typically covers a country or geographic area but might also cover either more than one country or geographic area, or only a part of a country of geographic area. The telecommunications network 100 comprises an access network 110 and a core network 120, and the telecommunications network 100 typically comprises a plurality of network cells or radio cells, one of which is only schematically represented in FIG. 1, a first radio cell 11' (having a base station entity 111) as part of the telecommunications network 100. The mobile communication network 100 typically comprises or is connected to (or is assigned to) a public safety answering point 200. The public safety answering point 200 might also be an emergency handling instance or emergency handling node 200, typically assigned to the country or geographic region served by the telecommunications network 100.

A mobile communication device 20 or user equipment 20 is schematically shown, in FIG. 1, being located in the coverage area of the mobile communication network 100 as well as being located in the coverage area of the radio cell 11'. The mobile communication device 20 is typically any mobile or portable or non-mobile or non-portable device being able to place emergency calls within the telecommunications network 100.

Such emergency calls are routed, within the telecommunications network 100, to the corresponding public safety answering point 200, and the emergency call is initiated by the mobile communication device 20 and set up as an IMS emergency call, i.e. an IMS call. In the context of the present invention, the term emergency call typically also encompasses so-called eCalls, i.e. automatically placed calls using an emergency number (typically 112) to establish a telephone link to the appropriate emergency call center (or public safety answering point) and to send details of the accident (MSD minimum set of data) to the rescue services, including the time of incident, the accurate position of the crashed vehicle and the direction of travel. When such emergency calls (i.e. whether "normal" emergency calls or eCalls) are made to an emergency center such as a public safety answering point special procedures are applied to ensure that the call is correctly routed and, if possible, not interrupted. However, there are situations where emergency calls (and also eCalls) are disconnected or where the public safety answering point might want to call-back the user equipment or mobile communication device after the call has been terminated.

In such a situation (and after an initiated emergency call (having been initiated by the mobile communication device 20) being interrupted or otherwise terminated), it is comparatively easy, for the public safety answering point 200 (or other entity), to reach the mobile communication device 200 in case that the mobile communication device 20 has a valid subscription to be used within the telecommunications network 100 which is typically the case if the telecommunications network 100 is the home public land mobile network (or home telecommunications network) of the mobile communication device 20. However, if this condition is not met, i.e. if either the mobile communication device 20 is roaming or corresponds to a roaming user of the telecommunications network 100, or if the mobile communication device 20 corresponds to a user lacking a valid subscription of the telecommunications network 100, it is more difficult if not possible at all for the public safety answering point 200 (or other entity), to reach the mobile communication device 200. Hence, a call-back attempt (by the public safety answering point 200) in order to continue the emergency call initiated by the mobile communication device 20 will likely fail.

According to the present invention, this outcome is able to be avoided, especially via a method for enhanced emergency call handling and/or continuation of the emergency call. It is assumed that the emergency call involves, on the one hand, the mobile communication device 20 in or connected to the telecommunications network 100, and, on the other hand, the public safety answering point 200 (or other legitimized entity) within or connected to or assigned to the telecommunications network 100. In case that the mobile communication device 20 lacks a valid subscription within the telecommunications network 100—i.e. especially in case it corresponds to a roaming user of the telecommunications network 100 or a user otherwise lacking a valid subscription of the telecommunications network 100—the method comprises the steps of:
  in a first step, the emergency call is initiated by the mobile communication device 20 and set up as an IMS emergency call,
  in a second step, during or subsequent to the first step, the mobile communication device 20 receives, from the telecommunications network 100, a temporary local profile information comprising security credential information and comprising or corresponding to a public identity of the mobile communication device 20 and provided by the telecommunications network 100,
  in a third step, subsequent to the second step, the mobile communication device 20 triggers an IMS registration at or to the telecommunications network 100, using the temporary local profile information.

In order to realize the call-back to the mobile communication device 20 (having initiated the emergency call), the public safety answering point 200 needs to be provided, in a fourth step, during or subsequent to the first step, with the public identity of the mobile communication device 20. In a fifth step, subsequent to the fourth step (and also subsequent to the third step, i.e. after the mobile communication device 20 having triggered the IMS registration at or to the telecommunications network 100), the public safety answering point 200 then initiates the call-back to the mobile communication device 20—using the public identity assigned to the mobile communication device 20—in order to establish a subsequent call to the mobile communication device 20 to realize a continuation of the emergency communication initiated or set up by the mobile communication device 20 during the first step.

According to the present invention, it is preferred that such subsequent calls (or call-backs) from the public safety answering point 200 are handled via local lines that are granted privileges comparable to emergency calls. Like with emergency calls these call-backs remain local (i.e. no routing takes place via the home public land mobile network in case of the mobile communication device 20 roaming, i.e. in case that the telecommunications network 100 serves as visited public land mobile network). To realize that callbacks remain local (i.e. no routing takes place via the home public land mobile network in case of roaming), the public safety answering points 200 are equipped with lines which can/may only be used for call-backs from real emergency calls or eCalls. The calls stemming from these lines are preferably handled comparable to incoming emergency calls and routed form the public safety answering point 200 via the local telecommunications network 100 to the mobile communication device 20 or user equipment. These lines are preferably granted privileges comparable to emergency calls, such that only connections from public safety answering points 200 to user equipments or mobile communication devices 20 from which the original emergency call originated are possible; and these calls are or can be prioritized over the normal voice calls according to local regulation. Additionally, these calls preferably remain in the local network(s) (also in the roaming case), and bypass configurations defined by users or the network, which can prevent an "emergency call-back", such as call forwarding, vibration-only mode, line busy or other. In order to ensure that a user equipment or mobile communication device 20 from which an emergency call/eCall originated can be reached by the public safety answering point 200, no calls other than those from an authorized entity are preferably accepted. The service provider has to or may reject the connection request to a connection from which an emergency call or eCall originated within the time in which the connection of the device must be held in the network (timer). This is comparable to the side dial protection for emergency connections according to local regulation.

To prevent misuse of call-back feature and to ascertain that only emergency calls can the called back, the public safety answering point 200 is preferably configured in a way that only connections are possible that are associated with a public identity (e.g. CLI (caller line identification), like Tel URI, MSISDN) via which the public safety answering point 200 received initially an emergency call; in particular callback to a legitimate origin (emergency).

In the following, the basic functionality according to the present invention is described:
In a first processing step, the user equipment or mobile communication device 20 initiates an emergency (eCall) call and during the IMS emergency call (or IMS eCall), in a second processing step, the user equipment—and especially an application within or on the user equipment or mobile communication device 20—can receive and use local profile data (private/public identity which are send by IMS signaling from an identity providing entity in the telecommunications network 100 (especially the visited telecommunications network 100) or directly by the public safety answering point 200 (but via the telecommunications network 100)), i.e. a temporary local profile information comprising security credential information and comprising or corresponding to a public identity of the mobile communication device (20) within the telecommunications network 100.

This local profile data (temporary local profile information) is preferably also connected (or related) to the identity of in the first step initiated emergency call and this relation is preferably populated also to the public safety answering point 200. There is also the possibility, according to a preferred embodiment of the present invention, to send, from the user equipment or mobile communication device 20, a correlation identifier which is received by the network (e.g. the public safety answering point 200) and is connected and resent with the local profile data.

In a third processing step, these data are used by a higher software layer of the user equipment 20, this software layer being responsible for the emergency call procedures and in a fourth processing step, after the emergency call ended (or has been disconnected) the user equipment or mobile communication device 20 is able to initiate a new local registration. Therefore, in case that a call-back (i.e. a subsequent call) is required, the call-back initiated by the public safety answering point 200 can be routed as a local terminating call (i.e. within the telecommunications network 100 even in case the telecommunications network 100 is acting as the visited telecommunications network 100 with respect to the mobile communication device 20) which is fully under control of the operator of the telecommunications network 100 (i.e. the visited network operator)—especially in case of roaming scenarios.

Hence, during an emergency call, the user equipment 20 or mobile communication device 20 (which was initiating the emergency call) preferably sends a correlation ID to a local network entity (AS, PSAP . . . ) and receives a temporary local profile from local network operator provided via sip signaling (header, body data separate message).

The application layer of the originating user equipment or mobile communication device 20 can store the received information including new private/public identity (MSISDN, SIP URI, temp eSIM profile, etc. . . . ) together with security credentials, the validity time and the correlation ID.

Optionally, a network entity other than the public safety answering point 200 might inform the public safety answering point 200 during the emergency call about the public identity, validity time and correlation ID.

After the emergency call has ended or is disconnected, the application layer of the user equipment 20 or mobile communication device 20 triggers a registration with the received local identity profile in the local operator network (i.e. in the telecommunications network 100).

In case that an emergency call-back shall be established, the public safety answering point 200 and/or the network operator is able to include an indication of the public safety answering point/emergency call-back type and because of the locally routed call the delivery and prioritization is guaranteed.

After a predefined time interval, the user equipment 20 de-registers itself or is de-registered by the telecommunications network 100.

The temporary local profile (private/public identity like T-IMSI, MSISDN, SIP URI, temp eSIM profile, etc. . . . ) is deactivated/deleted and the public identity (optionally network can send also an information to the public safety answering point 200).

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for emergency call handling, the method comprising the following steps:
   in a first step, an emergency call in a telecommunications network is initiated by a mobile communication device and set up as an IP multimedia subsystem emergency call, wherein the emergency call involves a public safety answering point, and wherein the mobile communication device corresponds to a roaming user of the telecommunications network;
   in a second step, during or subsequent to the first step, the mobile communication device receives, from the telecommunications network, temporary local profile information comprising security credential information and comprising or corresponding to a private identity and a public identity of the mobile communication device; and
   in a third step, subsequent to the second step and after the emergency call has ended or is disconnected, the mobile communication device, while roaming in the telecommunications network, triggers an IP multimedia subsystem registration at or to the telecommunications network using the private identity, the public identity, and the security credential information and without involving a home network of the roaming user, such that a call-back from the public safety answering point to the mobile communication device is not routed via a home network of the roaming user but is routed within the telecommunications network.

2. The method according to claim 1, wherein, during the third step, the IP multimedia subsystem registration is triggered by the mobile communication device either after the mobile communication device detects that the emergency call is disconnected or during a call dismantling procedure;
   wherein the mobile communication device triggers the IP multimedia subsystem registration using an emergency data connection used for the emergency call at or to the telecommunications network, or via establishing an emergency data connection at or to the telecommunications network.

3. The method according to claim 1, wherein, in a fourth step, during or subsequent to the first step, the public safety answering point receives at least the public identity of the mobile communication device;
   wherein the public safety answering point receives the public identity of the mobile communication device either from the mobile communication device while the emergency call is at least partly functional or from a network entity of or within the telecommunications network.

4. The method according to claim 3, wherein, in a fifth step, subsequent to the fourth step, the public safety answering point initiates a call-back to the mobile communication device—using the public identity of the mobile communication device—in order to establish a subsequent call to the mobile communication device to realize a continuation of the emergency communication initiated by the mobile communication device during the first step.

5. The method according to claim 4, wherein the subsequent call, during the fifth step, is or corresponds to a privileged call and/or uses a privileged data connection having privileges equal to or comparable to the privileges of emergency calls, such that the subsequent call is prioritized over normal voice calls and/or remains in the telecommunications network and/or bypasses user-defined potentially call-blocking configurations.

6. The method according to claim 1, wherein the mobile communication device receives the temporary local profile information either from the public safety answering point while the emergency call is at least partly functional or from a network entity of or within the telecommunications network;
   wherein the temporary local profile information is received via a non-access stratum (NAS) signaling mechanism from an IP multimedia subsystem network entity of the telecommunications network or from a network entity using session initiation protocol (SIP) or via an over the air (OTA) provisioning mechanism.

7. The method according to claim 1, wherein the temporary local profile information additionally comprises validity time information relating to a validity time interval during which the IP multimedia subsystem registration of the mobile communication device and its public identity are valid or usable, and wherein an IP multimedia subsystem de-registration regarding the temporary local profile information is triggered by either the mobile communication device or the telecommunications network.

8. The method according to claim 1, wherein the mobile communication device receives the temporary local profile information via non-access stratum (NAS) signaling using information elements or via session initiation protocol (SIP) signaling using header information and/or body information and/or a separate message; and
   wherein the temporary local profile information is stored, within the mobile communication device, in or as part of an application layer or in or as part of a call processing stack of the mobile communication device, wherein the public identity of the mobile communication device is independent from parameters or pieces of identification information related to the mobile communication device.

9. The method according to claim 1, wherein the temporary local profile information corresponds to a limited network configuration, wherein the limited network configuration only allows the mobile communication device to receive calls from the public safety answering point, wherein the public safety answering point corresponds to an ambulance entity, a firefighter entity, a mountain or sea rescue entity, or a third party eCall service provider entity.

10. A non-transitory computer-readable medium having processor-executable instructions stored thereon for emergency call handling, wherein the processor-executable instructions, when executed, facilitate the following steps being performed:
   in a first step, an emergency call in a telecommunications network is initiated by a mobile communication device and set up as an IP multimedia subsystem emergency call, wherein the emergency call involves a public safety answering point, and wherein the mobile communication device corresponds to a roaming user of the telecommunications network;
   in a second step, during or subsequent to the first step, the mobile communication device receives, from the telecommunications network, temporary local profile information comprising security credential information and comprising or corresponding to a private identity and a public identity of the mobile communication device; and
   in a third step, subsequent to the second step and after the emergency call has ended or is disconnected, the mobile communication device, while roaming in the telecommunications network, triggers an IP multimedia subsystem registration at or to the telecommunications network using the private identity, the public identity, and the security credential information and without involving a home network of the roaming user, such that a call-back from the public safety answering point to the mobile communication device is not routed via a home network of the roaming user but is routed within the telecommunications network.

11. A mobile communication device, comprising:
   a processor; and
   a memory having processor-executable instructions stored thereon for emergency call handling;
   wherein the processor-executable instructions, when executed by the processor, facilitate the following steps being performed by the mobile communication device:
   in a first step, an emergency call in a telecommunications network is initiated by the mobile communication device and set up as an IP multimedia subsystem emergency call, wherein the emergency call involves a public safety answering point, and wherein the mobile communication device corresponds to a roaming user of the telecommunications network;
   in a second step, during or subsequent to the first step, the mobile communication device receives, from the telecommunications network, temporary local profile information comprising security credential information and comprising or corresponding to a private identity and a public identity of the mobile communication device; and
   in a third step, subsequent to the second step and after the emergency call has ended or is disconnected, the mobile communication device, while roaming in the telecommunications network, triggers an IP multimedia subsystem registration at or to the telecommunications network using the private identity, the public identity, and the security credential information and without involving a home network of the roaming user, such that a call-back from the public safety answering point to the mobile communication device is not routed via a home network of the roaming user but is routed within the telecommunications network.

* * * * *